Nov. 26, 1957     J. L. WILSON     2,814,719
AUTOMATIC ELECTRIC ARC-STITCH WELDING
Filed Aug. 18, 1953
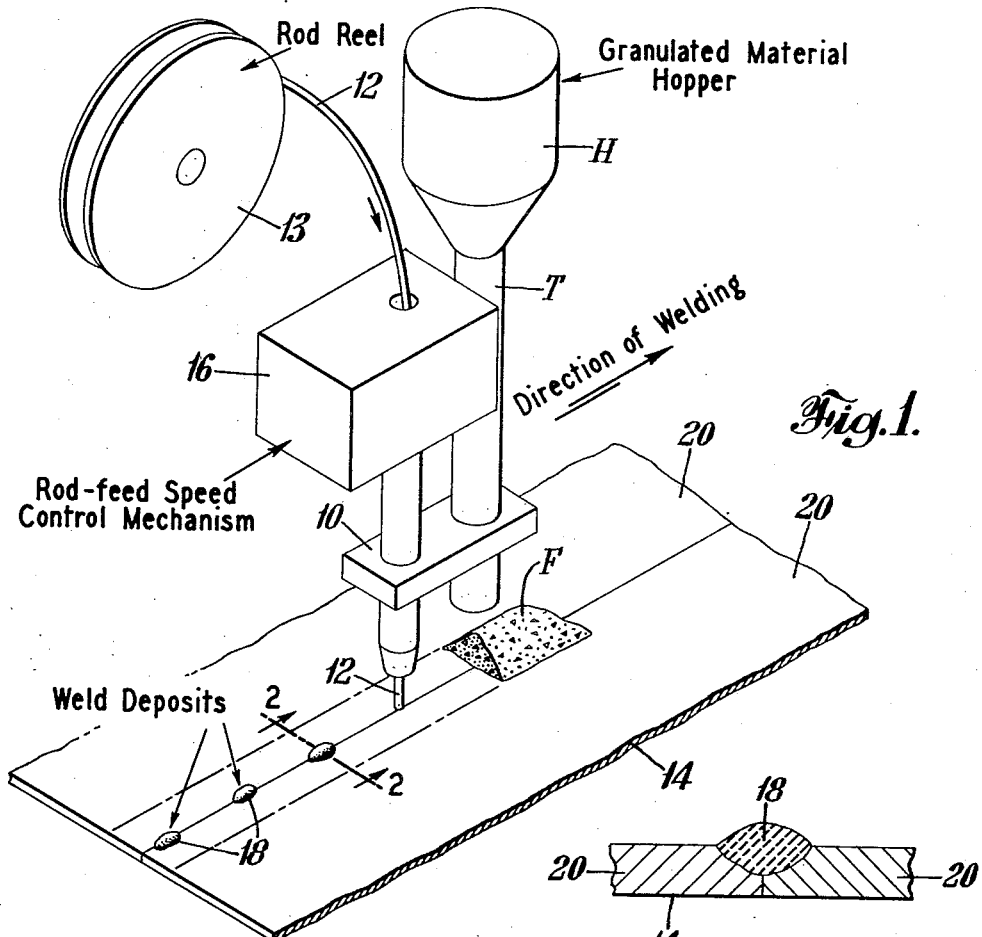
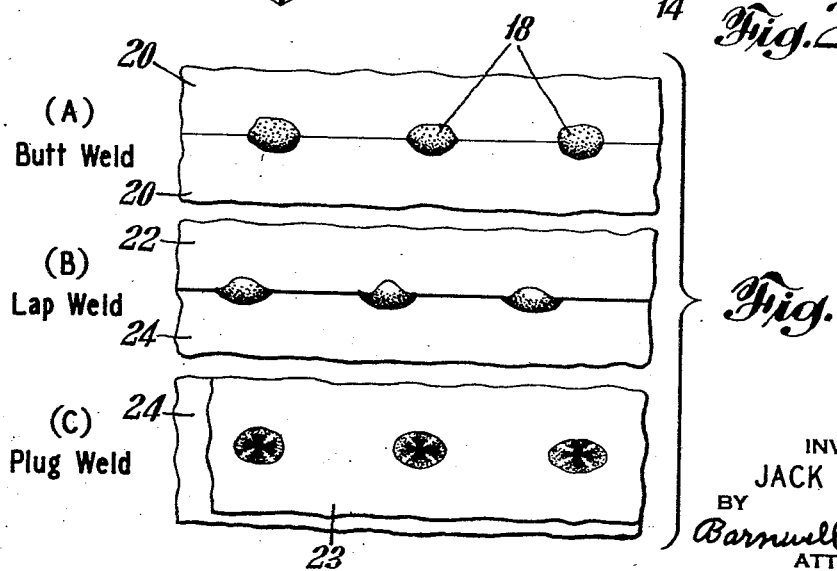
INVENTOR
JACK L. WILSON
BY
Barnwell R. King
ATTORNEY

United States Patent Office 2,814,719
Patented Nov. 26, 1957

2,814,719

AUTOMATIC ELECTRIC ARC-STITCH WELDING

Jack L. Wilson, Niagara Falls, N. Y., assignor to Union Carbide Corporation, a corporation of New York Application August 18, 1953, Serial No. 375,011

5 Claims. (Cl. 219—127)

This invention relates to electric arc welding and more particularly to such welding in which the work is in the welding circuit.

In many instances, where welding is used as a means of fabrication, the stress loading of the assembly is not such as to require continuous welds along the seams between the parts. Intermittent welds such as button or plug welds or short lengths of seam welds impart sufficient strength to the assembly, and, of course, require less deposited metal than continuous welds. Such intermittent welds are comparatively simple and easy to make by manual methods, but elaborate timing and other control devces are required if such welds are to be produced by automatic means. These are costly and difficult to maintain in proper operating condition.

It is an object of this invention to eliminate the need for elaborate control equipment with its attendant difficulties and to provide a simple yet automatic means of repetitively making button or plug welds intermittently along a seam to be welded.

In prior art welding, whether manual or automatic, wherein a continuous arc is maintained, the rate at which the electrode is fed toward the welding zone, is the same as the average melting rate. If the rod is fed mechanically at a fixed rate, then the arc current must be adjusted to produce the equivalent average melting rate.

The present invention departs from such prior practice by controlling the relationships between arc current, electrode diameter and electrode feeding rate. By feeding the electrode at a selected fixed rate and setting the arc current at a value sufficient to produce an electrode melting rate at least two times the feeding rate, when an arc is struck between a workpiece and the electrode, the latter melts rapidly, lengthening the arc until it is extinguished and the melted electrode metal coalesces with that of the workpiece to form a button or plug weld. Relative translatory movement lineally of the workpiece is maintained between the latter and the electrode, it strikes the workpiece again, another arc forms and the process is repeated. This action continues automatically until stopped by the operator.

The frequency with which the deposits of weld metal are made is chiefly a function of the rate at which the electrode is fed in relation to speed of translatory movement with respect to the workpiece; the size and the shape of the weld deposit, i. e., button or elongated weld, is chiefly a function of the current; the two effects are interrelated, however, and since melting rate is a volume phenomena, electrode diameter affects both weld spacing and size. The arc may be shielded with any suitable medium-gas or flux. Argon and/or helium gas is preferred in the case of sigma welding.

In the drawing:

Fig. 1 is a perspective view of apparatus illustrating the invention;

Fig. 2 is a fragmentary cross-sectional view of the work taken on line 2—2 of Fig. 1; and Fig. 3 is a fragmentary plan view of weld modifications.

An automatic arc welding head 10 is used to feed a consumable electrode 12 in the form of a rod drawn from a reel 13 along a workpiece 14. The energizing of the welding power preferably direct current circuit is maintained by means of a rod-feed speed control mechanism 16 which is adjusted to a feed rate such that the rod 12 strikes an arc on the workpiece 14 and melts a small amount of rod and base metal, forming a deposit 18 in the shape of an elongated button. The arc melts rod off faster than the feed rate supplies it, and the arc is, therefore, extinguished until the rod 12 again strikes the workpiece a short distance from the first weld, and the cycle is repeated. Continuous repetition of such cycle produces a series of "button-type" welds 18 along the path of travel of the welding head or workpiece. The size, spacing, and penetration of the welds 18 are varied by suitably adjusting the welding speed, rod feed rate, and current input.

Typical welds made according to the invention are illustrated in Fig. 3 of the drawing. These welds were produced by adjusting the welding power source to supply a continuous arc current of approximately 550 amperes and reducing the electrode feeding rate to about one third the rate required for continuous melting. The submerged arc welding process was used, as shown in Fig. 1, by means of a tube T carried by the welding head 10 and connected to a hopper H containing granular flux material, such as Linde "Unionmelt" flux, which is fed by the tube T on the path of the electrode 12 in advance thereof, forming a blanket F of flux under which the arc welds 18 are made. The butt weld (A) was made between sheets 20, 20 of steel of 14 ga. thickness; the lap weld (B) was made in 14 ga. steel sheets 22 and 24; and the plug welds (C) in an 18 ga. steel sheet 23 backed by a 14 ga. steel sheet 24. Welds of uniform size and spacing are produced by the invention.

In making the welds 18 of Fig. 3 (A), for example, size, composition, and feeding speed of the rod were, respectively, $\frac{1}{16}$-inch diameter HTS, having the approximate composition, carbon 0.15%, manganese 1.0 to 1.2%, silicon 0.20 to 0.30%, fed at a speed of approximately 480 inches per minute. The workpiece was mild steel, probably a low-carbon rimmed steel. Grade 50, 12 x 150-mesh Unionmelt was used. The equipment employed was a standard "Unionmelt" Type U head and Type UE electronic control. The voltage control potentiometer of the latter was set at zero, which cut out the automatic controlling feature, and the wire-feeding rate was regulated by adjusting the Variac of the control. The welding head was equipped with an eight-speed gear assembly for high rates of rod feeding. The speed of traverse of the welding head with respect to the work was 200 inches per minute. The center-to-center distance of the weld buttons or plugs varied slightly, but were within the range of $1\frac{1}{8}$ to $1\frac{1}{4}$ inches apart. The welding current, while continuously variable, averaged approximately 500 amperes. Of course the welding voltage was also continuously variable, within the range of 20 to about 55 volts while the rod was being melted and rising to the full open circuit voltage of approximately 100 after the arc was extinguished. The voltage was between 0 and 20 during the shorting and ignition period.

The invention is also suitable for sigma welding with helium, argon, and sigma argon as shielding gases.

This invention is not restricted to submerged-melt arc welding but includes other types of metal-arc welding such as "open" arc welding, sigma welding (Muller et al. 2,504,868), and shielded-arc welding. The invention is ideally suitable also for constant potential sigma welding (Kennedy 2,532,410) and constant potential submerged-melt arc welding (Kennedy 2,532,411).

I claim:

1. Automatic electric arc-stitch welding which comprises continuously feeding a fusible metal electrode at a selected rate toward a workpiece composed of fusible metal, continuously relatively moving such electrode and the workpiece along a path to be welded, and striking a series of self-regulating arcs between the workpiece and the moving end of the electrode, supplying arc welding current to each of such arcs at a value sufficient to produce an electrode melting rate substantially greater than such feeding rate, thereby automatically fusing end portions of the electrode and spaced portions of the workpiece along the path of relative movement therebetween, producing a series of uniformly spaced separate welds in such workpiece without interruption in movement of said electrode.

2. Stitch welding as defined by claim 1, in which such arc welding takes place under a blanket of granular flux material.

3. Stitch welding as defined by claim 1, in which the workpiece consists of sheet metal parts having abutting edges which are butt-welded together by such welds.

4. Stitch welding as defined by claim 1, in which the workpiece consists of overlapping sheet metal parts which are lap-welded together along the edge of one part by such welds.

5. Stitch welding as defined by claim 1, in which the workpiece consists of overlapping sheet metal parts which are plug-welded together by such welds.

References Cited in the file of this patent

UNITED STATES PATENTS

| | | |
|---|---|---|
| 1,293,871 | Murray | Feb. 11, 1919 |
| 2,025,785 | Southgate | Dec. 31, 1935 |
| 2,430,055 | Kennedy | Nov. 4, 1947 |
| 2,504,868 | Muller | Apr. 18, 1950 |
| 2,583,665 | Pilia | Jan. 29, 1952 |